(12) United States Patent
Lu et al.

(10) Patent No.: US 6,449,489 B1
(45) Date of Patent: Sep. 10, 2002

(54) METHOD AND APPARATUS FOR ADAPTIVE ADJUSTMENTS OF USER PROBE SIGNAL

(75) Inventors: Ming Lu, Hillsborough; Pengfei Zhu, Morris Plains, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/395,491

(22) Filed: Sep. 14, 1999

(51) Int. Cl.[7] .................... H04B 15/00; H04Q 7/20
(52) U.S. Cl. .................... 455/506; 455/69; 455/522
(58) Field of Search ............... 455/69, 522, 71, 455/63, 65, 504–506; 342/418

(56) References Cited

U.S. PATENT DOCUMENTS 5,564,074 A * 10/1996 Juntti ..................... 455/69
5,564,075 A * 10/1996 Gourgue ................. 455/69
6,101,179 A * 8/2000 Soliman ................. 455/522
6,138,033 A * 10/2000 Kitade et al. ............ 455/69
6,301,485 B1 * 10/2001 Lee ....................... 455/522

* cited by examiner

Primary Examiner—Nguyen T. Vo
(74) Attorney, Agent, or Firm—Ozer M. N. Teitelbaum; Claude Narcisse

(57) ABSTRACT

A method and apparatus for adaptively adjusting the power of a probe signal to be transmitted by user equipment based on a characteristic of received signals and system constants so as to increase the likelihood that the probe signal will be detected by system equipment of a communication system. The Doppler shift of a received pilot signal is derived and an adjustment parameter is calculated based on the Doppler shift, time interval between successive probe transmissions, and system constants. The adjustment parameter is applied to the probe signal to be transmitted to compensate for the effects of fading to be experienced by the probe signal to be transmitted.

10 Claims, 6 Drawing Sheets

METHOD AND APPARATUS FOR ADAPTIVE ADJUSTMENTS OF USER PROBE SIGNAL

BACKGROUND OF THE INVENTION

1. Field of the Invention

The present invention is generally related to a method and apparatus for improving a user's ability to gain access to a communication system and in particular to a method and apparatus for adjusting adaptively the power of a user equipment probing signal to increase the likelihood of detection by the communication system equipment.

2. Description of the Related Art

Communication systems, and in particular, wireless communication systems comprise a plurality of communication channels. through which subscribers of such systems communicate with each other and with the system. A portion of a typical wireless communication system is shown in FIG. 1. The wireless communication system of FIG. 1 depicts a cellular system comprising cells (e.g., 102, 104, 106, 108) whereby each cell is a symbolic representation of the physical terrain or geographical region covered by communication network equipment commonly known as cell sites or base stations (e.g., 110, 112, 114).

Each base station has system equipment comprising radio equipment (i.e., transmitter, receiver, modulator, demodulator) that are used to transmit and/or receive communication signals between a base station and a user equipment. The system equipment can also be located at places other than base stations. The term "user" hereinafter is used interchangeably with the term "subscriber" to indicate an entity (i.e., person, facility or a combination thereof) who is allowed access (when possible) to the communication system. Access to the communication system is the ability of a subscriber to make use of the resources (e.g., system equipment, communication channels) of the communication system. The user equipment (e.g., 140 in cell 104) is typically a cellular phone or any other communication equipment that is used by a subscriber of a communication system. For example, the user equipment can be a wireless portable computer or a pager. The system equipment further comprises processing equipment for retrieving information being carried by the communication signals and for implementing procedures based on communication protocols.

A communication protocol is a set of procedures or processes that dictate how communications between users of the communication system is to be initiated, maintained and terminated. The communication protocol also dictates the communications between a user and system equipment. Communication protocols are part of well known and established standards that are followed by operators of communication systems.

Still referring to FIG. 1, each user communicates with a base station via a wireless communication link. For example in cell 104, user 140 communicates with base station 114 via communication link 156. Typically, each wireless communication link comprises several communication channels. For example, for a Code Division Multiple Access (CDMA) wireless system, the communication link comprises an Access channel, a Paging channel and a Traffic channel. The Access channel is a channel through which user equipment transmits protocol information to a base station. The protocol information is information used by the system equipment operate and/or control the communication system. For example, a user requesting access to the communication system is allowed to use the communication system after various protocol information have been exchanged between the base station and the user equipment. In allowing the user to have access to the communication system, the system equipment identifies the user as a subscriber of the system, finds resources (e.g., communication channels, base station equipment) that can be made available to the user and allows the user to use (transmit/receive information) such resources in accordance with the protocol being followed by the communication system.

The Paging channel is a channel through which system equipment (e.g., base station) broadcasts protocol information to users of the communication system. The traffic channel is the channel used by the users to communicate with each other or with the system. The information conveyed through the traffic channel is, for example, voice, data, video, facsimile information or any other information typically conveyed by users of communication systems. The traffic channel consists of two channels: the first channel is called the reverse link through which users transmit information which information is received by the base station (or other system equipment); the second channel is called the forward link through which the base station (or other system equipment) transmits lo information to a user. Each user has a forward link and a reverse link assigned by the communication system. In addition to the other channels discussed above, some CDMA systems also have a pilot channel that is used to assist a user to request and obtain access to the communication system.

The pilot channel is a channel through which the system equipment broadcast a pilot signal that covers a certain area (e.g., cell area) of the communication system. The pilot signal serves as a sort of beacon signal that advertises the existence of the base station for any user who wants access to the communication system. The pilot signal also serves as a timing signal for the user equipment; that is, a pilot signal received by a user equipment (e.g., cell phone) is one of several signals used by the user equipment to synchronize its timing to the timing of the base station. The pilot signal is typically a system defined carrier signal; that is, the pilot signal is typically a signal of a single frequency, $f_c$. The user equipment has the proper hardware to receive and detect a pilot signal of appropriate power. Due to a well known phenomenon called the "Doppler effect," the frequency of the pilot signal received by the user equipment is $f_c \pm f_d$ where $f_d$ is called a "Doppler shift." The Doppler shift is the change in the carrier frequency that occurs due to the relative motion of user equipment to the base station equipment (or other system equipment) from which the pilot signal is transmitted. When the user equipment is moving away from the base station, the Doppler shift is subtracted from the carrier frequency. When the user equipment is moving toward the base station, the Doppler shift is added to the carrier frequency. It is also well known that the speed of the user equipment relative to the base station equipment directly affects the value (i.e., the amount of shift) of the Doppler shift.

A user initiates a request for access to the communication system by transmitting a probe signal. The probe signal is typically also a signal of a certain frequency which is also affected by the Doppler effect. The probe has two portions: the first portion is called the preamble which is typically a string of "0" bits or a string of "1" bits. The second portion of the probe is a message portion containing protocol information. The preamble is the portion of the probe that allows the base station (or other system equipment) to detect the probe. The system equipment decodes the message portion of the probe. Once the probe preamble is detected and the probe message is decoded, the system equipment initiates a certain procedure (in accordance with a protocol being followed by the communication system) to provide access to the user that transmitted the probe signal. Prior to initiating the procedure, the system equipment transmits an "acknowledge" (ACK) message to the user equipment indicating to the user equipment that the probe signal has been detected. Once the user equipment receives the ACK message it no longer transmits the probe signal and proceeds as per the protocol to obtain access to the communication system.

In many cases the probe signal is not detected by the system equipment because the power (or amplitude) of the probe signal received by the system equipment is attenuated due to various effects of the communication link. In such cases, the user equipment transmits the probe signal repeatedly until it receives the ACK message. For each repeated transmission of the probe signal, the power of the probe signal is increased by a system defined amount hereinafter referred to as "$\Delta$." A graph of the power of the probe signal versus time is shown in FIG. 2. Each probe is transmitted after a certain time interval $\tau+\tau_{r_i}$ where $\tau$ is a system defined time interval and $\tau_{r_i}$ is a time interval of random length for the $i^{th}$ probe signal. Thus, according to the graph of FIG. 1, the first probe has an amplitude of $P_1$, the second probe has an amplitude of $P_2$, the third probe has an amplitude of $P_3$ and so on. In general, the probe power can be expressed by the following equation: (1) $P_i=P_0+\Delta i$ where the $i^{th}$ probe has power $P_i$ and the initial probe power is $P_0$. $P_0$ is a system defined value that represents the initial probe power. Typically, the attenuation of the probe signal varies in a random manner. A main cause of random variations in the power or amplitude of a probe signal is due to a well known phenomenon called fading.

Fading generally relates to adverse effects on a signal (received by system equipment or user equipment) due to obstacles (e.g., buildings, towers, and other tall structures) and moving objects located between user equipment and system equipment. Therefore, fading affects the pilot signal, the probe signal as well as any other signal transmitted and/or received by the system and user equipment. Fading is caused by interference between two or more versions of a transmitted signal which are received at slightly different times. The fading phenomenon is manifested as amplitude (or power) variations in signals received by system or user equipment. A probe signal or a pilot (or any other signal) experiences different types of fading depending on the particular topography [physical demographics of the terrain] covered by a communication system. Fading is often graphically depicted as signal amplitude (or power) vs. time as shown in FIG. 3 and FIG. 4. FIG. 3 depicts a type of fading commonly known as "Raleigh fading" and FIG. 4 depicts another type of fading called "Log Normal fading". Generally, as can be clearly discerned from FIGS. 3 and 4, the variations in a signal's amplitude (or power) due to Raleigh fading occurs more frequently than the variations due to Log Normal fading.

As discussed earlier, fading is caused due to different versions of a signal being received at slightly different times. The correlation between the different versions of the signal being received varies with the speed of the user equipment relative to the system equipment. Correlation between two signals generally refers to an interdependence between two signals. For example, signals that are relatively highly correlated have relatively similar signal characteristics. Signal characteristics are parameters of a signal that are used to describe a signal. Examples of a signal's characteristic are amplitude, phase, frequency content, and power. Time correlation describes circumstances where there is an interdependence between different versions of the same signal at different instances of time. Thus, two versions of the same signal which are highly time correlated to each other will have similar phase, amplitude, power level and frequency content. Conversely, two versions of the same signal with low time correlation between them will have very little interdependence; the respective characteristics of such signals tend to have random variations with respect to each other as such signals are not as closely related to each other. It follows therefore that the fading for a relatively highly time correlated signals will have less variations (in amplitude, power, phase, frequency) than the fading for a relatively lower time correlated signals.

Referring to FIG. 5, there is shown the fading (Log Normal fading) of the power of a pilot signal received by user equipment moving at speed $v_1$ relative to the system equipment. FIG. 6 shows the fading of the same pilot signal received by user equipment moving at speed $v_2$ relative to the system equipment where $v_2>>v_1$. As explained supra, the fading depicted by FIG. 6 has more variations because of the relatively higher speed of the corresponding user equipment. FIG. 5 shows an example of "high correlation fading"; FIG. 6 shows an example of low correlation fading.

As discussed earlier, the power transmitted by a probe signal is increased by a specific amount (see equation (1)) until the probe signal is detected by the base station. Whenever, relatively large downward power variations (due to fading, for example) occur in a probe signal received by system equipment, a user equipment has to keep increasing its probe signal power level as per equation (1); in such a case, the likelihood of the probe signal interfering with neighboring base stations increases. For example, referring to FIG. 1, in cell 104 user 136 because of its proximity cell 102 may be transmitting a probe signal (to base station 114) that interferes with base station 110. Also, in such a case, the user equipment has to wait for a relatively long, period of time before detection, if ever, by the base station occurs; this is because several $\Delta$ amounts have to be added to the probe signal to compensate for the power variations.

Depending on the speed of the user equipment and its position relative to the base station, the probe signal received by the base station may experience a deep fade. In cases of deep fading (i.e., large attenuation of signal for, a certain time period), a high correlation deep fade means that the signal will remain in a deep fade for a relatively long time period. In such a case, an additional amount of power has to be added to the probe signal to compensate for the deep fade thus increasing the probability of detection. A low correlation deep fade means that the signal will remain in a deep fade for a relatively short period of lime. In cases of low correlation deep fades, a relatively small amount of power needs to be added to the probe to compensate for the deep fade. It is thus clear that depending on the type of fading that occurs a proper amount of power has to be added to compensate for such fading. It is also clear that the addition of a fixed $\Delta$ amount for all circumstances will lead to inefficient use of the power available for the probe.

What is therefore needed is a method of adjusting the power of a probe signal to properly compensate for fading effects on the probe signal and thus increase the likelihood that the adjusted probe signal will be detected by the system equipment. What is also needed is a method in which the power available for the probe signal is used efficiently.

SUMMARY OF THE INVENTION

The present invention provides an apparatus for generating an adaptively adjusted probe signal to be transmitted by user equipment of a communication system so as to increase the likelihood that such probe signal will be detected by system equipment when transmitted. The adjustment is based on an analysis of communication signals received from the system equipment and communication system constants. In a preferred embodiment, the power of the probe signal is adaptively adjusted and thus the power available for the probe signal is used in an efficient manner.

The apparatus comprises a first module wherein system constants are stored and a second module configured to derive signal characteristics from communication signals received from the system equipment. The apparatus further comprises a third module coupled to the first, and second modules which third module is configured to calculate an adjustment parameter based on the derived signal characteristics and the system constants and apply said adjustment parameter to a probe signal to be transmitted resulting in a modified probe signal. The apparatus then generates an adaptively adjusted probe signal by selecting from the modified probe signal and a system defined probe signal.

In a preferred embodiment, the first module stores a system decorrelation distance, a system scaling factor and a system defined maximum power probe signal. The second module derives a Doppler shift of a pilot signal received by the user equipment. A first section of the third module calculates an adjustment parameter from the decorrelation distance, a system timing signal and the system scaling factor. The first section applies the adjustment parameter to the power of the current probe signal to be transmitted resulting in a modified probe signal. The modified probe signal and the system defined maximum power probe signal are applied to a second section of the third module which second section generates the adaptively adjusted probe signal by selecting the smaller of the modified probe signal and the system defined maximum power probe signal.

DETAILED DESCRIPTION

The present invention provides an apparatus and method for adjusting adaptively a probe signal to be transmitted by user equipment of a communication system. The adaptive adjustment of the probe signal is based on an analysis by the apparatus of communication signals received by the user equipment. The adaptive adjustment is also based on measured system constants and defined system constants. In a preferred embodiment, the power of the probe signal to be transmitted is adaptively adjusted thereby increasing the likelihood that such probe signal, when transmitted, will be detected by system equipment of the communication system. The adaptive adjustment of the power of the probe signal also allows the power available for the probe signal to be used in an efficient manner.

The method of the present invention is an adaptive adjustment of the power of the probe signal based on the Doppler shift (and system constants) experienced by a pilot signal received by the user equipment. The Doppler shift, as explained earlier, provides an indication of the relative speed of the user equipment with respect to the system equipment (e.g., base station). The relative speed provides an indication of the type of fading (e.g., low correlation, high correlation) experienced by the pilot signal. Based on this indication of the type of fading, the power of a probe signal to be transmitted is adjusted accordingly thus compensating for the fading that the probe signal is likely to experience. The next probe signal that is transmitted is based on the application of a calculated adjustment parameter to the previously transmitted probe signal. The adjustment parameter is calculated with the use of the Doppler shift of a received pilot signal and on stored and measured system constants.

Figure 1:
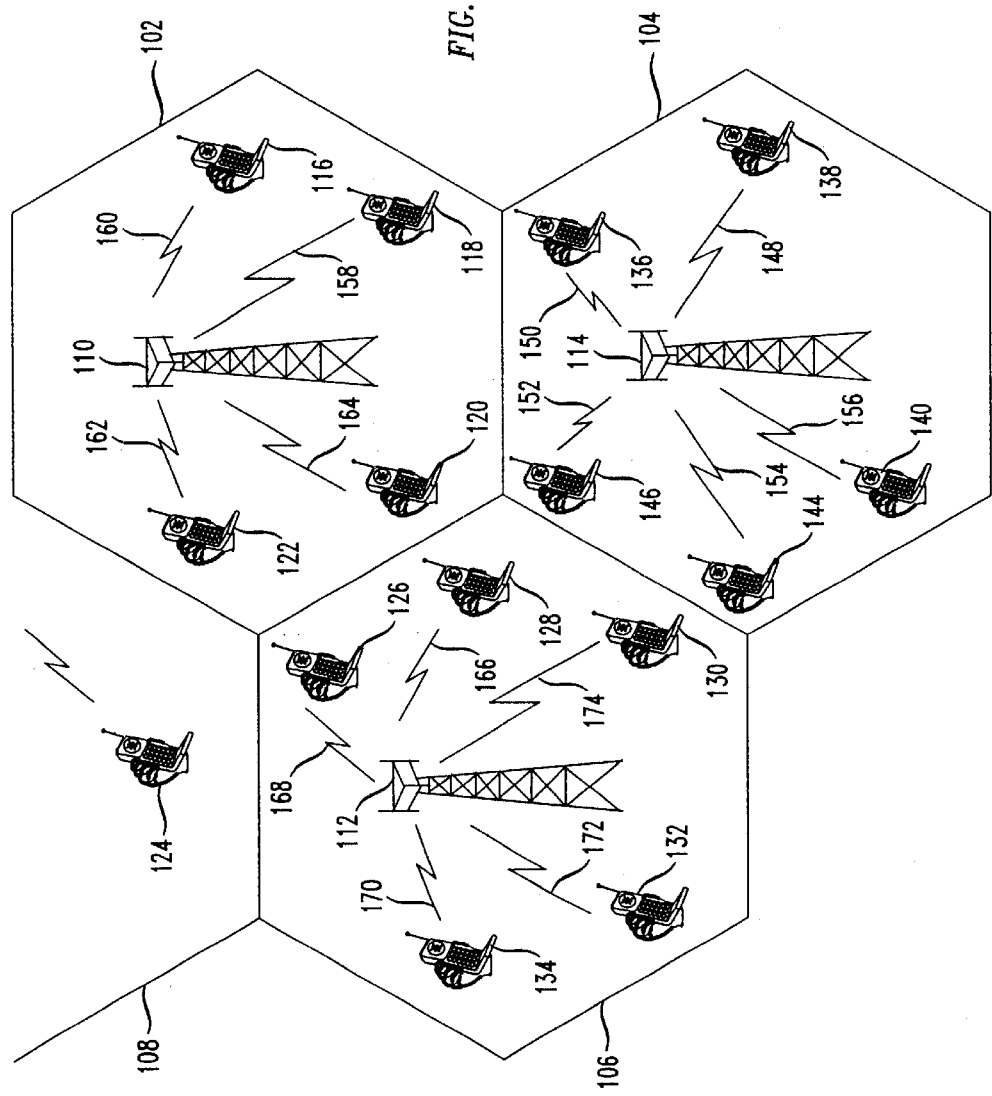
FIG. 1 depicts a typical topology of part of a cellular communication system.
Figure 2:
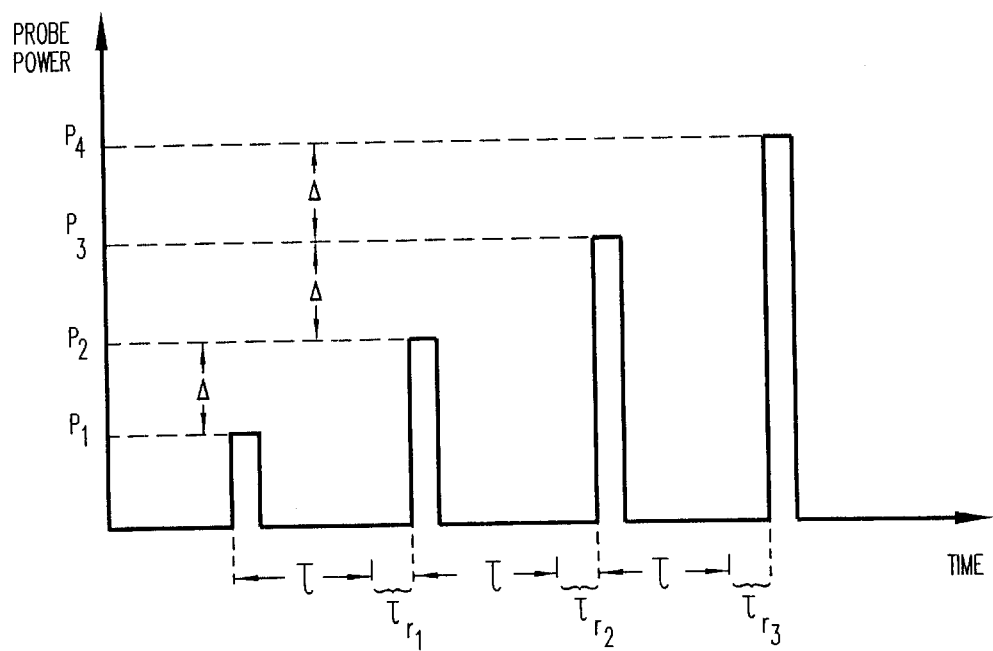
FIG. 2 is graph of probe signal power level versus time.
Figure 3:
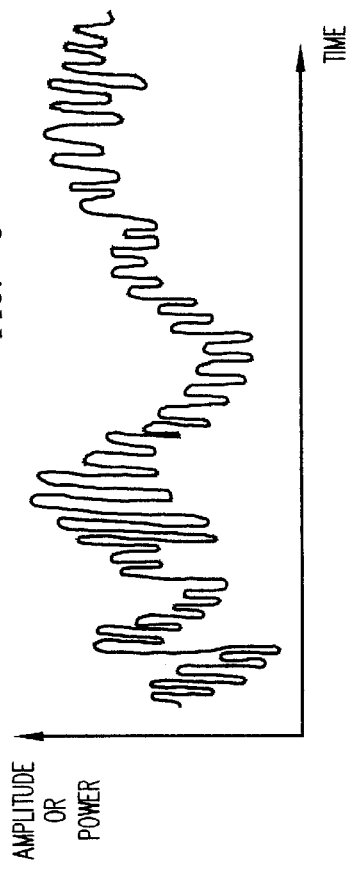
FIG. 3 is a graph of amplitude or power of signals with Raleigh fading characteristics received at a base station.
Figure 4:
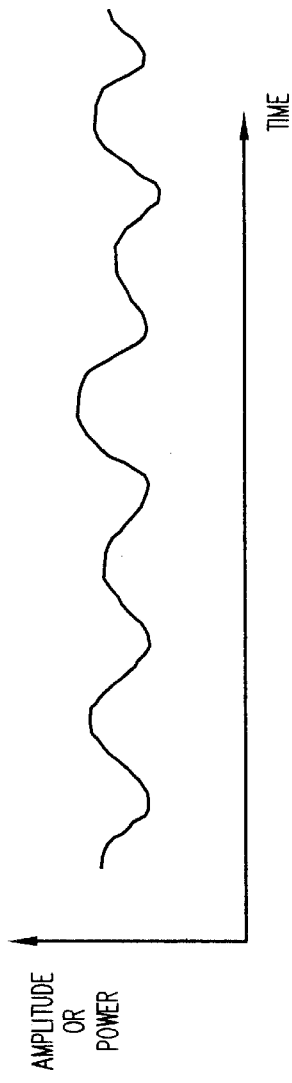
FIG. 4 is a graph of amplitude or power of signals having experienced Log Normal fading.
Figure 5:
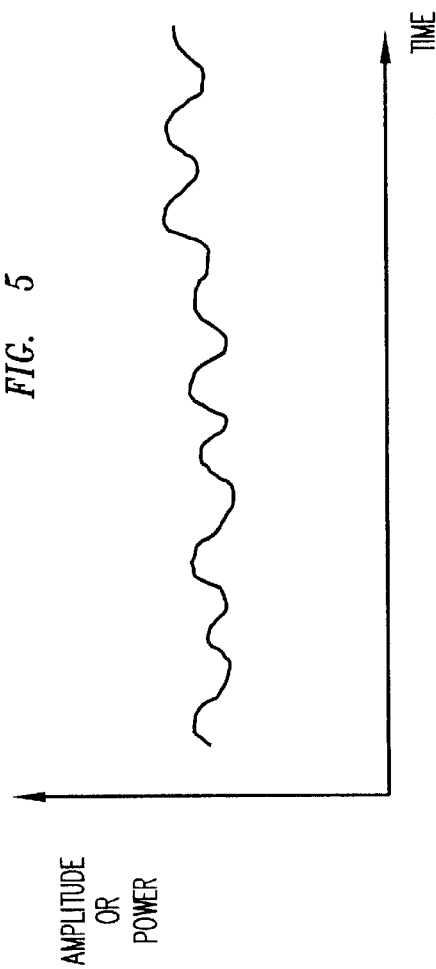
FIG. 5 is a graph of high correlation Log Normal fading of a pilot signal.
Figure 6:
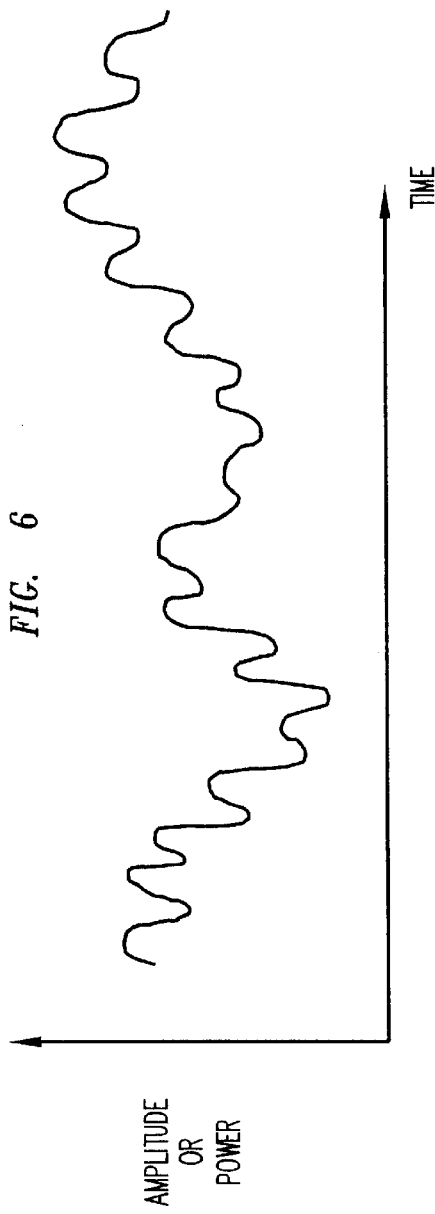
FIG. 6 is a graph of low correlation Log Normal fading of a pilot signal.
Figure 7:
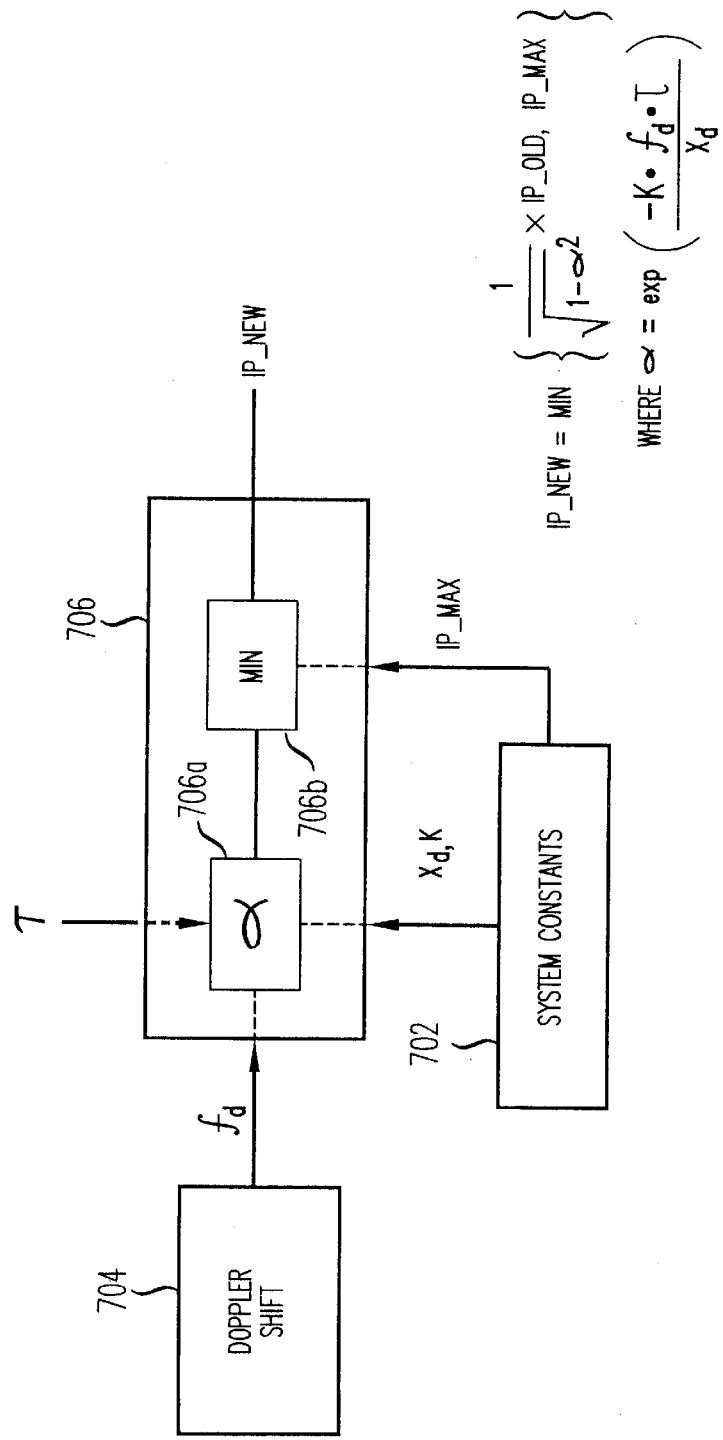
FIG. 7 is the apparatus of the present invention.

Referring to FIG. 7, there is shown the apparatus of the present invention in which the power of a probe signal to be transmitted is adaptively adjusted based on at least one characteristic derived from a received pilot signal and system constants. It will be understood that the apparatus of the present invention is not limited to adaptive adjustment of the power of a probe signal based on particular system constants and a derived characteristic of a pilot signal. More generally, the apparatus of the present invention is the adaptive adjustment of a signal to be transmitted (e.g., a probe signal) based on received communication signals (e.g., pilot signal) and particular system constants. However, for ease of discussion, the apparatus of the present invention as shown in FIG. 7 is described in terms of a wireless CDMA cellular communication system wherein the power of a probe signal is adaptively adjusted based on an analysis of a received pilot signal and system constants. It is clear that the apparatus of the present invention is part of a user equipment which apparatus can be implemented with hardware, software, firmware or a combination thereof. Further, the method and apparatus of the present invention are not limited to CDMA cellular communication systems and thus are applicable to different types of wireless communication systems.

Referring again to FIG. 7, a first module 702 has stored therein various system defined and system measured constants. Module 702 contains a constant called a decorrelation distance, $x_d$. The decorrelation distance is a distance for which a particular communication signal (e.g., a pilot signal) received from system equipment has a correlation coefficient of 0.5 or less. One particular type of correlation of a signal (in this case, the pilot signal) is a measured quantity that is based on the relative signal strength (e.g., power) at different locations with respect to the system equipment. For the particular embodiment being discussed, the decorrelation distance is for pilot signals received by user equipment. For example, the decorrelation distance, $x_d$, is obtained by first measuring the pilot signal's strength, s, (i.e., power level of received pilot signal) at a particular location $x_1$. The pilot signal's strength is again measured at another location, say, $x_2$ which yields a measurement of $S_2$. The varying strength of the pilot signal is modeled as a statistical process from which the Expectation, E, (a well known type of statistical average) and the statistical mean (i.e., $\bar{s}_1, \bar{s}_2$) are calculated. A standard deviation, $\sigma$ (another well known statistical quantity), for each of the measured values can also be calculated. The difference between the two locations (i.e., $x_1-x_2$) is a distance. The correlation coefficient is defined as $$\frac{E[s_1 \times s_2] - \overline{s_1} \times \overline{s_2}}{\sigma_{s_1} \sigma_{s_2}}. \quad (2)$$

The correlation coefficient is repeatedly calculated as the distance is increased. As the distance is increased, the correlation decreases and when a system defined correlation coefficient (e.g., say 0.5) is reached the distance measured is defined as the decorrelation distance. For many applications, a distance for which the correlation coefficient is 0.5 or less is defined as the decorrelation distance. The value of the decorrelation distance depends on such factors as carrier frequency and the physical environment. The value of the decorrelation distance is stored in a user's equipment for use in appropriate calculations.

Module 702 also contains a scaling factor K used to adjust various characteristics of a signal to be transmitted. The scaling factor is a system operator defined constant. Module 702 further contains, IP_max, which is system operator defined incremental maximum value (e.g., power level) for a probe signal. It should be noted that IP_max is totally arbitrary and can be changed or modified by the system operator.

Module 704 is a circuit or device which is configured to receive communication signals and derive at least one characteristic of the received signal. One particular characteristic which module 704 is configured to derive is the Doppler shift, $f_d$, of the received signal. In our example, module 704 is configured to receive the pilot signal from system equipment and generate the Doppler shift from the received pilot signal. Module 704 can be implemented in a variety of well known manners. One particular implementation of module 704 uses an Automatic Frequency Control (AFC) (not shown) loop which comprises a local oscillator having the same frequency as the pilot signal. The received pilot signal is synchronously detected, in a well known manner, by mixing it with the local oscillator. An error signal is generated which error signal is proportional to frequency shifts (including Doppler shift) experienced by the received pilot signal. The Doppler shift is then estimated by scaling the frequency shift by an appropriate factor. There are other well known techniques for deriving the Doppler shift of a signal and thus the present invention (method and apparatus) is not limited by the technique to described above.

A first section (706a) of module 706, which is coupled to modules 702 and 704, calculates a variable, α, in accordance with the following equation:

$$\alpha = \exp\left(\frac{-K \cdot f_d \cdot \tau}{x_d}\right) \quad (3)$$

where K is a constant (i.e., system scaling factor) and τ is the time interval between successive transmitted probes. The time interval is provided to first section 706a from timing circuitry (not shown) of the user equipment. Section 706a calculates an adjustment parameter, defined as $$\frac{1}{\sqrt{1-\alpha^2}}.$$

As described infra, the adjustment parameter is applied to Δ (i.e., system defined power increment) and such adjusted increment power is compared to a system defined maximum increment probe power, IP_max. The smaller of the IP_max and the adjusted increment power is selected as the increment to be added to the probe signal to be transmitted. Thus the probe signal is adaptively adjusted based on at least one characteristic of a received pilot signal and system constants.

Initially, when the user equipment is first activated, the power value of the probe to be transmitted is a system operator defined value $P_0$. The probe with the system defined power value plus Δ (i.e., $P_0+\Delta$) is the first probe to be transmitted. First section 706a calculates the next probe power level by applying (i.e., multiplying) the adjustment parameter to the power value of the probe just transmitted; that is the second increment in $$\frac{1}{\sqrt{1-\alpha^2}} \times \Delta.$$

The second increment power value and the IP_max value are fed to module 706b. Module 706b selects the smaller (in terms of power) of the two values. The selected value is hereinafter referred to as IP_new. The selected probe signal, which has an increment power value of IP_new, is then transmitted by the user equipment. In essence, module 706b compares the second increment power value to the system defined IP_max value. The smaller of the two values (i.e., IP_max and $$\frac{1}{\sqrt{1-\alpha^2}} \times \Delta$$

is chosen to be the increment power value of the second probe to be transmitted. The value of the increment for the third probe is chosen in the same manner. Therefore, in general, a new increment power level, IP_new, is calculated based on a selection between an adjusted old increment power level, IP_old, (i.e., the previous increment power value) and a system defined maximum increment power level (IP_max). The selection done is the minimum of the two values or the smaller of the two values. In other words, IP_new=MIN $$\left\{\frac{1}{\sqrt{1-\alpha^2}} \times \text{IP\_old}, \text{IP\_max}\right\}.$$

The symbol MIN is a function which selects the smallest of the different values within its brackets { }. Once IP_new is transmitted, it becomes IP_old (i.e., IP_old≡IP_new) and this IP_old is again adjusted by another adjustment parameter (as defined above) for the next probe to be transmitted. It should be noted that more than one characteristic can be derived from the pilot signal and that such characteristics can be used to adjust more than one characteristic of the probe signal to be transmitted. The present invention is not limited to only received pilot signals; other signals' characteristic can be derived and used to adaptively adjust the probe signal to be transmitted.

Figure 8:
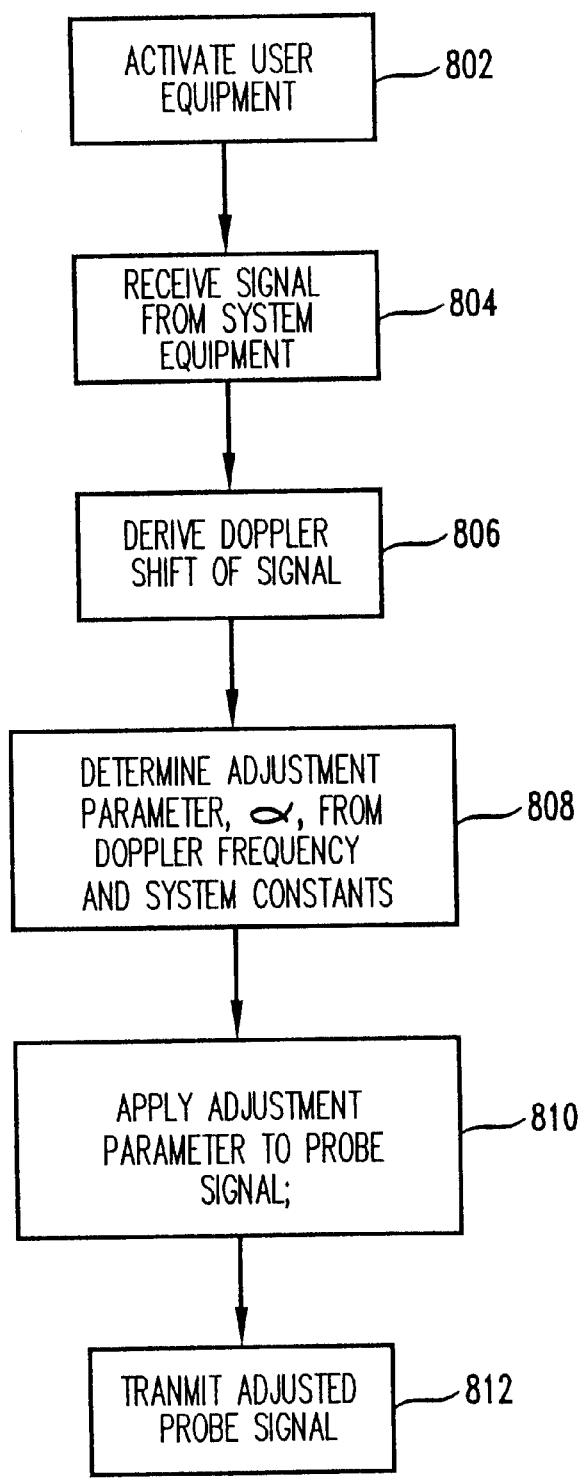
FIG. 8 is the method of the present invention.

Referring now to FIG. 8, there is shown the method of the present invention. In step 802, the user equipment is activated (e.g., cell phone is switched on ). In step 804, the user equipment receives and detects a communication signal (e.g., pilot signal) being transmitted by the system equipment. In step 806, the Doppler shift of the received communication signal is calculated by the user equipment. In step 808, the user equipment determines an adjustment parameter from measured and defined system constants and from the Doppler shift. In step 810 the adjustment parameter is applied (e.g., multiplied) to the power value of a probe signal to be transmitted. When the probe signal to be transmitted is the second probe signal (i.e., probe signal directly following the first probe signal) the adjustment parameter is applied to a system defined increment probe power value. The adjustment parameter is applied to the increment power value of the previously transmitted probe signal. In step 812, the smaller (in terms of increment power) of the adjusted increment and the IP_max is selected as the IP_new. After the probe is transmitted the IP_new becomes IP_old. It should be understood that the selected increment power is added to the probe signal to be transmitted resulting in an adjusted probe signal. The above procedure is then repeated for the next probe signal to be transmitted.

We claim:

1. An apparatus for adaptively adjusting a probe signal to be transmitted by user equipment of a communication system, the apparatus comprising:
    a first module within which system constants are stored;
    a second module configured to receive communication signals transmitted by system equipment and to derive at least one signal indicator of a type of fading experienced by the received communication signals; and
    a third module coupled to the first and second modules which third module calculates an adjustment parameter based on the system constants and the at least one indicator which adjustment parameter is applied to the probe signal.

2. The apparatus of claim 1 in which the stored system constants are a system scaling factor, K, a measured decorrelation distance, $x_d$, of the received signal and a system defined maximum incremental power value, IP_max.

3. The apparatus of claim 2 where the third module comprises a first section coupled to
    a second section and in which the first section calculates a variable, $\alpha$, where $$\alpha = \exp\left(\frac{-K \cdot f_d \cdot \tau}{x_d}\right)$$

and also calculates the adjustment parameter, $$\frac{1}{\sqrt{1-\alpha^2}}.$$

which adjustment parameter is applied to an increment power of the probe signal resulting in an adjusted increment power and where the adjusted increment power and IP_max signal are fed to the second section which selects the smaller of IP_max signal and the adjusted increment power.

4. The apparatus of claim 1, where the received communication signals are pilot signals and the second module is configured to derive Doppler shifts of the received pilot signals as said indicator.

5. The apparatus of claim 4 where the second module is an Automatic Frequency Control loop.

6. The apparatus of claim 1 where the communication system is a CDMA system and the received communication signals, whose at least one characteristic is derived, are pilot signals.

7. A method for adjusting adaptively a probe signal to be transmitted in a communication system, the method comprising:
    receiving a communication signal from system equipment of the communication system;
    calculating an adjustment parameter from system constants and at least one indicator derived from, and indicative of a type of fading experienced by, the received communication signals; and
    applying the adjustment parameter to the probe signal resulting in an adjusted probe signal.

8. The method of claim 7, where said indicator is the received signal's Doppler shift, $f_d$ and where calculating an adjustment parameter comprises:
    deriving the received signal's Doppler shift, $f_d$;
    calculating a variable a defined as exp $$\left(\frac{-K \cdot f_d \cdot \tau}{x_d}\right)$$

where K is a system scaling factor, $\tau$ is a system timing interval, and $x_d$ is a measured decorrelation distance of the received signals; and
    calculating $$\frac{1}{\sqrt{1-\alpha^2}}$$

defined as the adjustment parameter.

9. The method of claim 7 where applying the adjustment parameter to the probe signal comprises:
    multiplying the adjustment parameter to an increment power value of the probe signal resulting in an adjusted increment power;
    selecting the smaller of the adjusted increment power and a system defined maximum incremental power value, IP_max;
    adding the selected increment to the probe signal; and
    transmitting the adjusted probe signal.

10. The method of claim 7 where the received communication signals, whose at least one characteristic is derived, are pilot signals of a CDMA communication system.

* * * * *